UNITED STATES PATENT OFFICE.

LUDWIG H. REUTER, OF BERKELEY, CALIFORNIA.

DRY MAGNESIUM-CHLORID COMPOSITION AND PROCESS OF MAKING THE SAME.

1,117,443.  Specification of Letters Patent.  Patented Nov. 17, 1914.

No Drawing.  Application filed July 7, 1908.  Serial No. 442,273.

*To all whom it may concern:*

Be it known that I, LUDWIG H. REUTER, a citizen of the United States, residing at Berkeley, in the county of Alameda and State of California, have invented a new and useful Dry Magnesium-Chlorid Composition and Process of Making the Same, of which the following is a specification.

The object of my invention is to provide for a process of manufacturing a dry chlorid of magnesium preparation, yielding a product, which can be used as an addition to dry magnesite cements, dispensing thereby with the handling of the cement in two separate packages, or as an addition to fireproof paint or for making surgical bandage preparations.

A special feature of my invention is, to provide for an addition to the composition, of ingredients which have the tendency to eliminate the injurious effects which some of the ingredients contained in the principal raw material required, would have on the stability of the final product, whether that be a magnesite cement or a paint or a bandage.

I have made a thorough investigation of the various processes and methods described for making dry chlorid of magnesium. I have also investigated experimentally the stability of some magnesite cements and of paints, to which I have added chlorid of magnesium and calcined magnesite, and I have found a process for producing a dry preparation of chlorid of magnesium, which does not possess the drawbacks of other preparations of that character,—viz. which is free from decomposition products, which furthermore eliminates injurious constituents of the calcined magnesite and makes the same harmless, and which finally produces a cement which is not hygroscopic and which has a greater stability and durability than any other preparation on the market, and can be handled in one package, so that it can be used simply by adding water.

I have found that chloride of magnesium, though it acts quickly upon anhydrous calcined magnesite which is, by the addition of an aqueous solution of chlorid, hydrated and oxychlorided *in statu nascendi;* yet it does not act as well upon partly or wholly hydrated calcined magnesite; viz. upon calcined magnesite containing more or less magnesium hydrate $(Mg(OH)_2)$. In another patent application, Serial No. 425,442, filed April 6, 1908, I have already mentioned this fact and I have described in said application the use of sulfate of magnesium as a remedy, as I have found that it acts quicker on $Mg(OH)_2$ than the chlorid.

Now I have found that some flooring compositions, though seemingly satisfactory for the first few months, did not prove to be lasting and durable, and as the result of my investigations I have found that practically every magnesite contains more or less calcium carbonate, which by calcination of the magnesite, is converted in calcium oxid (CaO); I have found that as soon as the magnesite cement, comprising fillers and calcined magnesite, is mixed with an aqueous solution of chlorid of magnesium, this oxid of lime contained in calcined magnesite, will be converted first into calcium hydrate $Ca(OH)_2$, which then will precipitate from the chlorid of magnesium solution a proportionate quantity of hydrated magnesia $(Mg(OH)_2)$, forming at the same time chlorid of calcium, which not combining with some of the balance of oxid of magnesium available, will constitute an injurious decomposition product, which being one of the most hygroscopic substances known, has the tendency to make finished magnesite cements, though they were hard and faultless in the beginning, and especially in dry weather, absorb moisture from the foundation below, or from above after some time. The following equation represents the reaction:

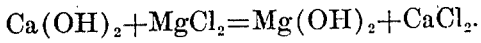

Now I have found that the calcium oxid or hydrate contained in all calcined magnesites can be eliminated and converted into a harmless compound, by adding to all cement preparations, comprising as active constituents chlorid of magnesium and calcined magnesite, enough sulfate of magnesium to convert all calcium hydrate or oxid into sulfate of calcium, forming at the same time a proportionate quantity of hydrate of magnesium; which *in statu nascendi* combines with the excess of sulfate of magnesium and with the chlorid of magnesium respectively:

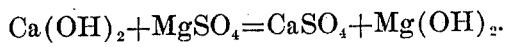

To be sure of the elimination of all calcium oxid or hydrate I prefer to use an excess of sulfate of magnesium; the quantity of the latter required, has to be calculated from an analysis to be made of each lot of calcined magnesite used.

Another feature of my invention, providing for a dry preparation of chlorid of magnesium, is the preparation proper of the dry chlorid, previous to the incorporation of the calcined magnesite. Investigations, which I have carried on in this direction, confirmed statements found in the literature, that liquid or crystallized chlorid of magnesium cannot be converted easily into a dry practically anhydrous condition by a mere evaporation of the water.

A practically anhydrous chlorid cannot be obtained by a mere evaporation without involving a great loss of valuable material and without obtaining an article contaminated with decomposition products, which are inert and have no cementing properties. I have found furthermore that the process described in the scientific literature and consisting in heating crystallized chlorid of magnesium and chlorid of ammonium, though yielding in the end an anhydrous product, is difficult to carry on on a large scale, viz. where ton lots of anhydrous chlorid are required; it is evident that such a method is far too expensive for practical purposes if no means are provided for the purpose of recovering the chlorid of ammonium at a small cost, and in such a condition that it can be used over again in subsequent operations. I have found also that a process described in the literature and consisting in heating and evaporating a solution of chlorid of magnesium with oxid of magnesium involves a great loss of material, inasmuch as a solution, even if it be as strong as 36 Beaumé, still contains in addition to about 18 per cent. of water, present as solvent, not less than 44 per cent. of water of crystallization, or a total of 62 per cent. of water; viz. sufficient water to produce with the oxid of magnesium, oxychlorid, which in this case is nothing but an undesirable decomposition product void of any cementing properties, if once dried and powdered. I have found furthermore, that equally undesirable results are obtained if a process is used, which consists in evaporating a concentrated solution of chlorid of magnesium with calcium carbonate until hydrochloric acid is given off; in this process chlorid of calcium is formed, which being an extremely hygroscopic substance and being void of cementing properties, can be considered only as a very dangerous contamination of a cement.

Now I have discovered a novel and new way of producing a dry preparation of chlorid of magnesium, which does away with all the draw-backs of other methods described before. My new method consists in heating and evaporating a solution of chlorid of magnesium or the crystallized salt, which may be in loose crystals or in fused form, (the latter usually containing 1 to 2 per cent. less water, and 1-2 per cent. more chlorid than the former) together with carbonate of magnesium or ground magnesite, until practically all the water is evaporated, and then adding an excess of dry sulfate of magnesium, that is, enough to convert the calcium oxid, contained in the calcined magnesite, to be added later on, into sulfate of calcium ($CaSO_4$), and enough to bind the hydrate of magnesium ($Mg(OH)_2$), eventually contained or formed on exposure during storage, in the calcined magnesite, to be added later on, finishing the drying process at higher temperatures, until a practically anhydrous mixture is obtained, granulating or powdering the mixture, and mixing it with the required quantity of calcined magnesite. If this "dry preparation of chlorid of magnesium" is required for flooring cement, it can be mixed with the necessary quantity of fillers, such as infusorial earth, sand, powdered limerock, magnesite, dolomite, or steatite, which have been dried previously if necessary for the purpose of removing moisture. The whole mixture is then packed in airtight containers. This "single package" magnesite cement, comprises magnesium carbonate (preferably magnesite) soluble salts of magnesium (chlorid and sulfate) and oxid of magnesium, and it requires only the addition of water previous to its application, and yields a cement, which has a greater durability and stability than any other similar preparation on the market. If the dry preparation of chlorid of magnesium is required as a fixative binder, which I have described in a previous Patent No. 1,107,356 patented August 18, 1914, only calcined magnesite or oxid of magnesium needs to be added. If the dry preparation of chlorid of magnesium is used for fire-proof paint, in addition to calcined magnesite, fillers can be added, such as powdered talcum, gypsite, Paris white, and the like.

As an instance of manufacture, I melt a soluble magnesium salt, crystallized chlorid of magnesium, which usually contains about 45.5 to 46.5 per cent. of $MgCl_2$ and about 51.5-52 per cent. of water; or I melt fused chlorid of magnesium, usually containing about 46 to 48 per cent. of $MgCl_2$ and about 50-52 per cent. of water; or I heat a more or less concentrated solution of chlorid of magnesium until practically all the water, which had been present as solvent, is evaporated, viz. I heat until the remaining hot mass contains about 48 per cent. of chlorid of magnesium and about 50 per cent. of water and about 2 per cent. of the impurities usually met with in the chlorid of magnesium of the market. Then I add to each 100 lbs. of this hot liquid mass, which will have a temperature of about 280-290° F., about 20 lbs. of ground magnesite, (care being taken to avoid the use of carbonate of magnesium containing oxid of magnesium or calcined magnesite). Then I continue to heat, preferably stirring, whereby the mass becomes thicker and thicker. When a temperature of about 310-320° F. is reached, I add (if the percentage of calcium oxid found by analysis in the calcined magnesite, which is added later, is much, viz. amounts to 2-3 per cent., and the quantity of hydrated magnesia ($Mg(OH)_2$) found in the same calcined magnesia amounts to about 5 per cent.) about 5-7 lbs. of a soluble magnesium salt, preferably anhydrous sulfate of magnesium, or the proportionate quantity of sulfate of magnesium containing from 1-4 molecules of water of crystallization. Then I continue to heat, stirring all the time, until the mass becomes so stiff that it cannot be stirred any more. Then I allow the mass to cool down, preferably in a drying closet. Thereafter I break the hard lumps in small pieces and then I proceed to granulate or powder the same. To each 200 lbs. about of this dry preparation I add then about 400 to 500 lbs. of calcined magnesite. Furthermore, I add, if the preparation is used for a "single package cement", about 500 to 600 lbs. of filling materials, all previously dried if necessary, such as infusorial earth, sand, silica, talcum, powdered limerock, dolomite, magnesite, asbestos, powdered wood-pulp, cork or sawdust, and the like; also pigments can be added if required. The mixture is then packed without delay in air-tight containers and ready for use to be mixed with water only before application.

As an instance of manufacture, if the dry preparation of chlorid of magnesium is to be used as a fixative binder, or for surgical bandages I use about 20-30 lbs. of the dry mixture, comprising anhydrous chlorid of magnesium, anhydrous sulfate of magnesium, and ground magnesite with 70-80 lbs. of calcined magnesite. To this mixture, if it is to be used as a fixative binder, about 10% pigments can be added. If the dry preparation is to be used for a fire-proof paint, about 20 lbs. of it can be mixed with about 30-40 lbs. of calcined magnesite and about 40-50 lbs. of powdered mineral matter comprising powdered talcum, gypsite, Paris white, dolomite, magnesite, clay-bearing materials, silica, and the like.

I am aware that for instance a dry preparation may be obtained by mixing from the start a saturated solution of chlorid of magnesium with the sulfate and the carbonate of magnesium, and drying the liquid mass by means of a vacuum or by dropping it on moving rolls which are heated by superheated steam, or otherwise, and from which the dry mass is scraped off by a knife-like device. Therefore I do not wish to limit myself to the method of evaporating and drying the materials, as a variety of machines can be used for that purpose which give the same final result. I am aware also that the invention can be carried out for special purposes with changes in the proportions described without departing from the scope of the invention as expressed in the claims.

Having thus described the invention, what I claim is:—

1. A process of making a dry magnesium chlorid composition which comprises adding about 5 parts by weight of magnesium sulfate to a dehydrated magnesium chlorid and magnesium carbonate composition containing about 120 parts, heating, adding over 250 parts by weight calcined magnesite and heating, and continuing to heat it at a higher temperature than that at which the magnesite was added.

2. A process of making a dry magnesium chlorid composition which consists in adding about 5 parts by weight of magnesium sulfate to a composition containing about 100 parts magnesium chlorid and about 20 parts magnesium carbonate from which the water has been evaporated, heating, adding calcined magnesite, heating at a higher temperature, and continuing to heat it at a higher temperature than that at which the magnesite was added.

3. A process of making a dry magnesium chlorid composition which consists in adding magnesium sulfate to a composition containing magnesium chlorid and magnesium carbonate from which the water has been evaporated and adding calcined magnesite, the amount of magnesium sulfate being sufficient to eliminate the calcium oxid and hydrate contained in the calcined magnesite by converting them into sulfate of calcium and magnesium hydrate and to combine with the magnesium hydrate *in statu nascendi* along with the chlorid of magnesium in the presence of moisture.

4. A process of making a dry magnesium chlorid composition which consists in heating and evaporating chlorid of magnesium and ground magnesite until practically all the water is evaporated, then adding a sufficient amount of dry sulfate of magnesium, to convert all calcium hydrate or calcium oxid, contained in the magnesite, into sulfate of calcium, continuing to heat at a higher temperature until a practically anhydrous mixture is obtained, and mixing with calcined magnesite.

5. A process of making a dry magnesium chlorid composition which consists in heating and evaporating chlorid of magnesium and ground magnesite until practically all the water is evaporated, then adding more than enough dry sulfate of magnesium, to convert all calcium hydrate or calcium oxid, contained in the magnesite, into sulfate of calcium, continuing to heat at a higher temperature until a practically anhydrous mixture is obtained, mixing with calcined magnesite, and immediately packing in air-tight containers.

6. A process of making a dry magnesium chlorid composition which consists in heating to about 310° F. and evaporating a mixture of about 80% of chlorid of magnesium and about 16% of ground magnesite until practically all the water is evaporated, then adding about 4% of dry sulfate of magnesium, continuing to heat at a higher temperature until a practically anhydrous mixture is obtained, and mixing with about twice the quantity by weight of calcined magnesite.

7. A process of making a dry magnesium chlorid composition which comprises heating and evaporating chlorid of magnesium in the presence of magnesium carbonate, adding calcined magnesite and adding a sufficient amount of magnesium sulfate to convert all calcium hydrate or calcium oxid, contained in the magnesite, into sulfate of calcium.

8. A process of making a dry magnesium chlorid composition which consists in adding more than enough of magnesium sulfate to a mixture of the chlorid and magnesite from which the water has been evaporated to convert all hydrate or calcium oxid contained in the magnesite into sulfate of calcium, continuing to heat, and adding magnesium oxid.

9. A dry cement comprising about 80% by weight of a mixture of chlorid of magnesium, calcined magnesite and magnesium carbonate, and a soluble magnesium salt capable of being mixed in a dry state with said mixture without forming a cement therewith until moistened, and sufficient in quantity to convert the oxid of calcium in the calcined magnesite into sulfate of calcium.

10. As a product of manufacture, a dry cement comprising about 100 parts by weight magnesium chlorid, about 20 parts carbonate of magnesium, about 250 parts calcined magnesite, and about 5 parts of magnesium sulfate.

11. As a product of manufacture, a dry cement comprising about 100 parts by weight of chlorid of magnesium, 20 parts of magnesite, 250 parts of calcined magnesite, and enough sulfate of magnesium to bind the hydrate of magnesium in the calcined magnesite.

12. As a product of manufacture, a dry cement, comprising about 100 parts by weight chlorid of magnesium, 5 parts sulfate of magnesium, 20 parts carbonate of magnesium, 250 parts oxid of magnesium, and filling materials.

In testimony whereof I have hereunto set my hand, in the presence of two subscribing witnesses.

LUDWIG H. REUTER.

Witnesses:
W. S. Wood,
W. H. Kelly.